United States Patent Office 3,023,235
Patented Feb. 27, 1962

3,023,235
NEW AMINO ACIDS AND DERIVATIVES THEREOF
Frederick Leonard, Yonkers, N.Y., assignor to Geigy Chemical Corporation, Ardsley, N.Y., a corporation of Delaware
No Drawing. Filed Nov. 24, 1958, Ser. No. 775,719
6 Claims. (Cl. 260—519)

This invention relates to novel carboxytyrosines, derivatives thereof and salts thereof with acids and bases, as well as to processes for their manufacture.

The new class of compounds can be represented by the following general formula:

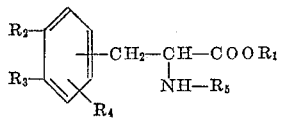

I wherein $R_1$ represents hydrogen, lower alkyl groups, such as methyl, etyl, propyl, butyl, amyl and hexyl groups, or benzyl groups, $R_2$ represents the hydroxy group, lower alkoxy groups, such as methoxy, ethoxy, propoxy, butoxy, amyloxy and hexyloxy groups, lower alkanoyloxy groups, such as formyloxy, acetyloxy, propionyloxy and butyryloxy groups, aryloxy groups, such as phenoxy and substituted phenoxy groups, or aryl-lower-alkoxy groups, such as benzyloxy and substituted benyloxy groups, $R_3$ represents carboxy, lower carbalkoxy, cyano or carboxyamido groups, $R_4$ represents hydrogen, hydroxy, lower alkyl groups, such as methyl, ethyl, propyl, butyl, amyl and hexyl groups, or lower alkoxy groups, such as methoxy, ethoxy, propoxy, butoxy, amyloxy and hexyloxy groups, and $R_5$ represents hydrogen, lower alkanoyl groups, such as formyl, acetyl, propionyl and butyryl groups, benzoyl groups or benzyloxycarbonyl groups.

Surprisingly it has now been found that the new compounds are useful medicaments, particularly fast acting analgetic agents of low toxicity, i.e. they can be used for the relief of pain. They may be administered orally or parenterally in the form of the free compounds, their non-toxic acid addition salts with inorganic or organic acids, such as hydrochloric acid, hydrobromic acid, phosphoric acid, acetic acid, oxalic acid, tartaric acid, citric acid etc., or in the form of alkali metal salts of the free carboxylic acid compounds. The new compounds of this invention may be used therapeutically as the racemic mixtures of d- and l-forms which are obtained by synthesis. They may also be resolved into the corresponding optically active modifications which, likewise, may be used in therapy.

The presently preferred compounds are compounds of the formula:

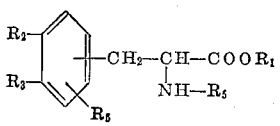

Ia wherein $R_1$ represents hydrogen or lower alkyl groups,
$R_2$ represents the hydroxy group, lower alkoxy, lower alkanoyloxy groups or the phenoxy group,
$R_3$ represents the carboxy group, lower carbalkoxy groups or the cyano group, $R_4$ represents hydrogen, lower alkyl or lower alkoxy groups, and
$R_5$ represents hydrogen or the acetyl group, and non-toxic acid addition salts thereof.

The members of the new class of compounds of the general Formula I may be obtained in a number of ways.

(A) They may be prepared by hydrolysis and decarboxylation of appropriately substituted acylamido malonic acid esters of the formula:

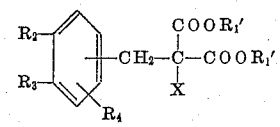

II wherein $R_1'$ represents a lower alkyl radical or the benzyl radical,
X represents an acylamido or acylimido radical, and
$R_2$, $R_3$ and $R_4$ have the meanings given above.

In Formula II $R_1'$ may be presented, e.g. by the ethyl or methyl radical, and X by the formamido, acetamido, benzamido, phthalimido or benzyloxycarbonylamino radical. Decarboxylation can take place when both the ester groups and the amido or imido groups are already hydrolysed, or after partial hydrolysis of the ester groups only. In this case, compounds of the general Formula I with the free amino group are obtained by further hydrolysis after decarboxylation.

(B) According to the Schmidt reaction, substituted α-benzyl acetoacetic acid esters of the general formula:

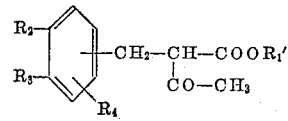

III wherein $R_1$, $R_2$, $R_3$ and $R_4$ have the meanings given above, are converted by treatment with hydrazoic acid into the substituted α-acetamido-β-phenylpropionic acids or esters encompassed by the general Formula I which, if desired, are hydrolysed to form compounds with the free amino group in α-position.

(C) Compounds of the general Formula I may also be obtained by reduction of substituted β-phenylpropionic acid derivatives of the general formula:

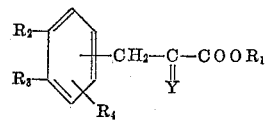

IV or

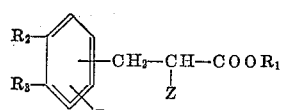

V wherein

Y represents a bivalent nitrogen-containing group which can be converted into the amino group by reduction or reductive cleavage, such as the imino group, oximino group, benzylimino or phenylhydrazono group, Z represents a monovalent nitrogen-containing group which can be converted into the amino group by reduction or reductive cleavage, such as the nitro group, the azido group or the dibenzylamino group, and $R_1$, $R_2$, $R_3$ and $R_4$ have the meanings given above.

(D) Substituted benzylmalonamic esters of the general formula:

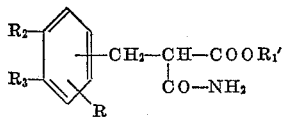

VI wherein $R_1$, $R_2$, $R_3$ and $R_4$ have the same meanings as previously defined, may be treated with an alkali hypohalite according to Hofmann. With concomitant hydrolysis of the ester group, compounds of the general Formula I are obtained.

Alternatively substituted benzylcyanoacetic acid hydrazides of the general formula:

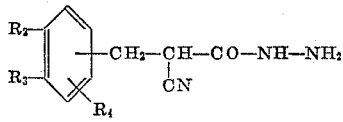

VII wherein $R_2$, $R_3$ and $R_4$ have the meanings given above, may be converted into the corresponding azides with the aid of nitrous acid. According to the Curtius reaction, the azides are decomposed by treatment with suitable hydroxy compounds, e.g. ethanol or benzylalcohol, to form the corresponding carbamates, and the latter are hydrolysed to form compounds of the general Formula I.

(E) Compounds of the general Formula I may further be obtained from substituted α-halo-β-phenylpropionic acids and esters of the general formula:

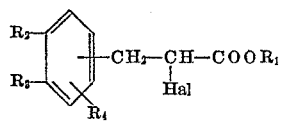

VIII wherein Hal may be a bromine, chlorine or iodine atom, and $R_1$, $R_2$, $R_3$ and $R_4$ have the meanings given above, by direction ammoniation, i.e. interaction with ammonia, or by reaction with a salt of a dicarboxylic acid imide or diacylimide, particularly potassium phthalimide, followed by hydrolytic cleavage of the imido moiety, e.g. with sulphuric acid.

(F) Compounds of the general Formula I may also be obtained by treating aldehydes of the general formula:

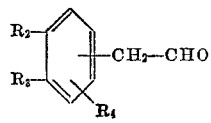

IX wherein $R_2$, $R_3$ and $R_4$ have the same meanings as in Formula I, with a mixture of an alkali metal cyanide and ammonia. Hydrolysis of the intermediate aminonitrile of the general formula:

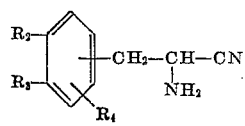

X yields compounds of general Formula I.

(G) Another method of preparing the compounds of the general Formula I is by reduction followed by hydrolysis, or reductive cleavage of easily accessible classes of heterocyclic compounds, such as substituted 4-benzylidene hydantoins of the general formula:

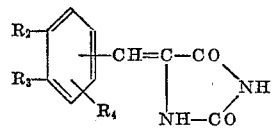

XI substituted 3.6-benzylidene-2.5-diketo-piperazines of the general formula:

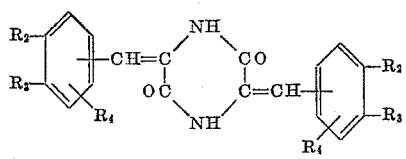

XII and substituted 4-benzylidene-oxazolones of the general formula:

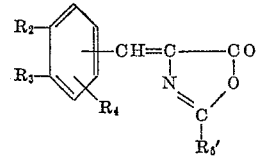

XIII wherein $R_2$, $R_3$ and $R_4$ have the meanings given above, and $R_5'$ represents a lower alkyl group or the phenyl radical.

The reduction to substituted compounds can be effected, e.g. by means of sodium amalgam and sodium hydroxide solution, or tin and hydrochloric acid, the hydrolysis, e.g. with hydrochloric acid, and the reductive cleavage is performed by means of hydriodic acid in the presence or absence of red phosphorus. It is, however, also possible to partially hydrolyse oxazolones of the general Formula XII to substituted α-acylamidocinnamic acids of the general formula:

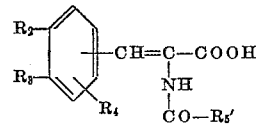

XIV wherein $R_2$, $R_3$, $R_4$ and $R_5'$ have the meanings given above, whereby $R_5'$—CO—corresponds to $R_5$ of Formula I. These cinnamic acid derivatives can be reduced, e.g. by hydrogenation in the presence of a palladium catalyst, to substituted α-acylamido-β-phenyl-propionic acids of the general Formula I.

(H) Finally, compounds of the general Formula I, wherein $R_3$ represents a carboxyl group may be prepared by treatment of the hydroxyphenyl-alanines of the general formula:

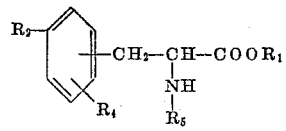

XV wherein $R_1$, $R_2$, $R_4$ and $R_5$ have the meanings given above, with carbon dioxide under pressure.

In spite of the fact that the methods for the production of compounds of the general Formula I seem to differ to some extent from each other, the starting materials for these methods can preferably be prepared from a few classes of compounds, of which some representatives are already known. Such compounds chiefly are halomethyl salicylic acids and their derivatives, and formyl salicylic acids and their derivatives.

Thus, by condensation of halomethyl compounds of the general formula:

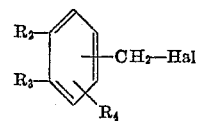

XVI wherein $R_2$, $R_3$, $R_4$ and Hal have the meanings above, with metal compounds of acylamido or acylimido malonic acid esters of the general formula:

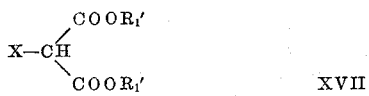

wherein $R_1'$ and X have the meanings given above, starting materials of the general Formula II are obtained. By the analogous condensation of the above mentioned halomethyl compounds with metal compounds of acetoacetic acid esters, the starting compounds of the general Formula III are obtained, which can be submitted direct to the Schmidt reaction or can be converted into starting materials of the general Formula IV, e.g. by reaction with an alkyl nitrite, or with an alkali metal and benzene diazonium chloride. Further, halomethyl compounds of the general Formula XVI can be condensed with metal compounds of cyanoacetic acid esters, and the substituted benzylcyanoacetic acid esters so obtained can be partially hydrolysed to form substituted benzylmalonamic acid esters of the general Formula VI, or the benzylcyanoacetic acid esters can be converted by reaction with hydrazine into substituted benzylcyanoacetic acid hydrazides of the general Formula VII. The previously named condensation products of the halomethyl compounds with acetoacetic acid ester or cyanoacetic acid esters or analogous condensation products with malonic acid esters can be converted into α-halo-β-phenyl-propionic acids and their esters of the general Formula VIII by halogenation, hydrolysis, subsequent or concomitant decarboxylation and, if desired, esterification. These acids and esters are also useful for the preparation of starting materials of the general Formula V, e.g. by reaction with sodium or potassium nitrite or azide. Finally, the above mentioned halomethyl compounds can be reacted with alkali metal cyanides, and the latter can be converted into substituted phenylacetaldehydes of the general Formula IX, e.g. by reduction with stannous chloride and hydrogen chloride according to Stephen.

On the other hand, formyl salicylic acids and their derivatives of the general formula:

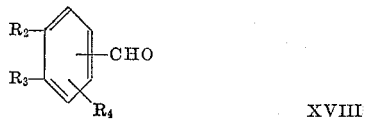

wherein $R_2$, $R_3$ and $R_4$ have the meanings given above, can be condensed with hydantoin or thiohydantoin to form substituted 4-benzylidene hydantoins of the general Formula XI, or substituted 4-benzylidene thiohydantoins. The latter can be converted into the corresponding hydantoins, e.g. by treatment with aqueous chloroacetic acid. Further, the formyl compounds of the general Formula XVIII can be condensed with 2.5-diketo-piperazine (glycine anhydride) or acetylglycine anhydride in the presence of acetic anhydride and sodium acetate to form substituted 3.6-bis-benzylidene-2.5-diketopiperazines of the general Formula XII. When acylglycines, such as acetylglycine or hippuric acid are condensed with formyl compounds of the general Formula XVIII, substituted 4-benzylidene oxazolones of the general Formula XIII are obtained, which can be used as indicated above or which can be hydrolysed with non-reducing acids, e.g. hydrochloric acid to form substituted phenylpyruvic acids which, in their turn, can be converted into starting materials of the general Formula IV, e.g. by treatment with ammonia, hydroxylamine or benzyamine.

By reacting formyl compounds of the general Formula XVIII with nitroacetic acid esters, substituted α-nitro-β-hydroxy-β-phenylpropionic acid esters are obtained which can be dehydrated to form substituted α-nitro-cinnamic acid esters. These are reduced to substituted α-nitro-β-phenylpropionic acid esters, which are among the starting materials of general Forumla V. Finally, as a possibility of producing starting materials of the general Formulae VI and VII from formyl compounds of the general Formula XVIII, the condensation of the latter with cyanoacetic acid esters followed by reduction of the substituted benzylidine cyanoacetic acid esters to form substituted benzylcyanoacetic acid esters which can be converted further as indicated above, may be mentioned.

Among the starting materials of the general Formula XVIII for the last mentioned process for the production of compounds of the general Formula I are such well-known compounds as optically active and racemic tyrosine, its isomers, ethers, esters and N-acyl derivatives, and 3,4-dihydroxy-phenylalanine and its analogous derivatives.

It is clear, in view of the reaction conditions of some of the methods for the preparation of compounds of the general Formula I, that original ester groups $R_3$, acyloxy groups $R_2$, N-acyl groups $R_5$ and, occasionally, also cyano or carboxamido groups $R_3$, and even ether groups $R_2$ cannot or can only with difficulty be retained during the reactions. Therefore, it is in many cases more advisable to prepare esters, acyloxy compounds and N-acyl compounds of the general Formula I by esterification of free carboxylic acids or by acylation of compounds with one or two free hydroxy groups and/or a free amino group. On the other hand, compounds of the general Formula I with a cyano group $R_3$ may be partially or totally hydrolysed to form compounds with a carboxamido or carboxyl group $R_3$. Also compounds with an ether group $R_2$ or an N-acyl group left unchanged during their preparation or even originating from e.g. the Schmidt reaction, can be converted by hydrolysis or, in the case of e.g. benzyl ethers, by hydrogenolysis into other compounds of the general Formula I.

The preparation of the compounds of the present invention is more fully described in the following examples. It is to be understood that the examples are illustrative of the methods employed and are not to be construed as limiting the invention to the particular reactions which are specifically described.

The temperatures are given in degrees centigrade.

EXAMPLE 1

(a) *5-Chloromethyl-2-Methoxybenzoic Acid*

152 g. of o-methoxybenzoic acid was suspended in 750 ml. of concentrated hydrochloric acid. To the suspension was added at a temperature of 5–10°, 87.5 g. of 37% formaldehyde. The resulting mixture was saturated at a temperature of 0–15° with gaseous HCl. The flask was stoppered and the reaction mixture was set aside for two days at room temperature. 5-chloromethyl-2-methoxybenzoic acid crystalised from the reaction mixture; yield, 120 g., M.P. 97–98°, after recrystallisation from benzene.

Anal.—Calcd. $C_9H_9ClO_3$: C, 53.72; H, 4.50. Found: C, 53.53; H, 5.05.

(b) *Diethyl Acetamido-(3-Carboxy-4-Methoxybenzyl)-Malonate*

A solution of 26.2 g. (0.4 mole) of sodium ethylate in absolute alcohol was prepared by dissolving 9.2 g. (0.4 g. atom) of sodium in 175 ml. alcohol. The solution was cooled to 50° and 434 g. (2 mole) of diethyl acetamido-malonate dissolved in 80 ml. ethanol were added. The mixture was stirred for 15 minutes at a temperature of 60° and then a solution of 41.4 g. (0.2 mole) of 5-chloromethyl-2-methoxybenzoic acid dissolved in 100 ml. alcohol was added all at once. The mixture was stirred and refluxed for 12 hours and left to stand overnight. Alcohol was removed in vacuo, the residue dissolved in 250 ml. of water and the solution made to pH 6.5. The solution was extracted with ether and dried over sodium sulfate. Ether was removed and the remaining heavy syrup dissolved in sodium bicarbonate.

It was extracted with benzene to remove unreacted acetamidomalonate. Acidification of the bicarbonate solution with dilute hydrochloric acid gave a precipitate of diethyl acetamido - (3 - carboxy - 4 - methoxybenzyl)-malonate. It melted at 117° after recrystallisation from benzene.

Anal.—Calcd. for $C_{18}H_{24}NO_8$: C, 56.84; H, 5.52; N, 3.68. Found: C, 56.46; H, 5.82; N, 3.75.

(c) *3-Carboxy-4-Methoxyphenylalanine Hydrochloride*

7 g. (0.02 mole) of diethyl acetamido-(3-carboxy-4-methoxybenzyl)-malonate were refluxed with a mixture of 45 ml. of water and 5 ml. of concentrated hydrochloric acid for 12 hours. The reaction mixture was concentrated to dryness in vacuo and the crystalline solid recrystallised to constancy of melting point in isopropyl alcohol. M.P., 215–216° with decompositiond. Yield: 1.5 g.

Anal.—Calcd. for $C_{11}H_{13}NO_5HCl$: C, 48.08; H, 5.09; N, 5.09. Found: C, 48.08; H, 5.49; N, 5.33.

EXAMPLE 2

*3-Carboxytyrosine Hydrochloride*

1.5 g. of 3-carboxy-4-methoxyphenylalanine hydrochloride described in Example 1(c) were refluxed with 20 ml. of concentrated hydrochloric acid for 14 hours. Concentration of the reaction mixture in vacuo and recrystallisation of the residue from a mixture of ethanol and methanol gave 1 g. of 3-carboxytyrosine hydrochloride. M.P., 260–261°.

Anal.—Calcd. for $C_{10}H_{11}NO_5HCl$: C, 45.97; H, 4.60; N, 5.37. Found: C, 46.34; H, 4.97; N, 5.49.

EXAMPLE 3

*Ethyl 2-Amino-3-(3'Carbethoxy-4'-Hydroxyphenyl)-Propionate Hydrochloride*

1.5 g. of 3-carboxytyrosine hydrochloride, prepared as described in Example 2, were dissolved in 50 ml. of ethyl alcohol and the solution was saturated in a pressure bottle with hydrogen chloride gas. After 12 days at room temperature, the reaction mixture was concentrated in vacuo and the residue recrystallised from a mixture of ethyl acetate and alcohol. Yield, 1 g. M.P. 207–209°.

Anal.—Calcd. for $C_{14}H_{19}NO_5HCl$: C, 52.83; H, 6.28; N, 4.40. Found: C, 52.74; H, 6.74; N, 4.68.

EXAMPLE 4

*Ethyl 2-Amino-3-(3'-Carbethoxy-4'-Methoxyphenyl)-Propionate Hydrochloride*

3 g. of the substituted phenylalanine hydrochloride described in Example 1(c) were dissolved in 60 ml. of absolute ethanol and the solution was saturated with gaseous hydrogen chloride. The mixture was stored for 8 days at room temperature and concentrated in vacuo. The crystalline residue was recrystallised from ethyl acetate and melted at 175°. Yield: 2.2 g.

Anal.—Calcd. for $C_{15}H_{21}NO_5HCl$: C, 54.21; H, 6.62; N, 4.21. Found: C, 54.37; H, 7.26; N, 4.21.

EXAMPLE 5

(a) *Methyl 5-Bromomethyl-2-Phenoxybenzoate*

A mixture of 19.2 g. of N-bromosuccinimide, 120 ml. of dry carbon tetrachloride, 24.8 g. of methyl 2-phenoxy-5-methylbenzoate and 4 g. of benzoylperoxide was refluxed for 8 hours. After cooling, the succinimide was filtered off and washed with carbon tetrachloride. The filtrate was washed with sodium bisulfite solution, dried with $MgSO_4$ and the solvent was evaporated. The residue was dissolved in benzene, passed through an aluminum oxide column and eluted with benzene. The benzene was evaporated in vacuo, leaving an oily residue. Yield: 32 g.

Anal.—Calcd.: $C_{15}H_{13}BrO_3$: Active Br 24.9. Found: Active Br 24.50.

(b) *Diethyl Acetamido-(3-Carbomethoxy-4-Phenoxybenzyl)-Malonate*

A solution of sodium ethylate in alcohol was prepared from 2.3 g. of sodium and 100 ml. of absolute alcohol. To this solution were added 21.7 g. of diethyl acetamidomalonate and after a few minutes a solution of 31.5 g. of methyl 5-bromomethyl-2-phenoxybenzoate in 50 ml. of benzene. The mixture was refluxed for 5 hours and left to stand at room tempearture over night. Sodium bromide was removed and the solvents evaporated in vacuo. Methanol was added to the residue and the crude material placed in the refrigerator. The product crystallised after 2 weeks and was recrystallised from isopropyl alcohol. Yield: 9 g. M.P. 99–102°.

Anal.—Calcd. for $C_{24}H_{27}NO_8$: C, 63.01; H, 5.95. Found: C, 63.18; H, 5.51.

(c) *3-Carboxy-4-Phenoxy-N-Acetylphenylalanine Hydrochloride*

5 g. of crude malonic ester obtained as described above were refluxed for 96 hours with 65 ml. of 4 N hydrochloric acid. The reaction mixture was cooled, extracted with ether, and evaporated to dryness. The residue was dissolved in water and the pH of the solution adjusted to 4.5 with sodium acetate solution. The precipitate was removed by filtration, dissolved in 2 N hydrochloric acid and filtered. The addition of alcohol precipitated a high melting unidentified solid. The solution was evaporated to dryness and the residue recrystallised from isopropyl alcohol and water. M.P. 178–180°.

Anal.—Calcd. for $C_{18}H_{17}NO_6$: C, 62.98; H, 4.99; N, 4.08. Found: C, 62.92; H, 5.28; N, 4.45.

EXAMPLE 6

(a) *3-Chloromethyl-2.6-Dimethoxybenzonitrile*

16.3 g. of 2.6-dimethoxybenzonitrile were mixed with 75 ml. of concentrated hydrochloric acid and 9 ml. of 37% formaldehyde while cooling. The mixture was saturated with hydrogen chloride gas while keeping the temperature below 10° and then stirred for 3 hours at 10°. The reaction mixture was filtered and the product dried. It was recrystallised from N-hexane-benzene, 9:1, then from cyclohexane. Yield: 19.5 g., 92%. M.P. 91–92°.

Anal.—Calcd. for $C_{10}H_{10}ClNO_2$: C, 56.74; H, 4.76; Cl, 16.75. Found: C, 56.73; H, 5.10; Cl, 16.98.

(b) *Diethyl Acetamido-(2.4-Dimethoxy-3-Cyanobenzyl)-Malonate*

To a solution of 2.8 g. of sodium in 150 ml. of absolute alcohol were added 26.5 g. of diethyl acetamidomalonate, followed by a solution of 25.8 g. of 3-chloromethyl-2.6-dimethoxy benzonitrile in 75 ml. of benzene. The mixture was refluxed for 7 hours, allowed to stand at room temperature overnight, then filtered. Alcohol was distilled off, the residue taken up in benzene, filtered from sodium chloride, the filtrate diluted with hexane until turbid and set aside to crystallise. Recrystallisation from benzene gave an analytically pure product. M.P. 132–133°.

Anal.—Calcd. for $C_{19}H_{24}N_2O_7$: C, 58.16; H, 6.16; N, 7.14. Found: C, 58.53; H, 6.34; N, 7.52.

(c) *2,4-Dimethoxy-3-Cyanophenylalanine Hydrochloride*

6.0 g. of diethyl acetamido-(3-cyano-2.4-dimethoxybenzyl)-malonate were refluxed with 40 ml. of 6 N hydrochloric acid for 6 hours. The solution was evaporated in vacuo and the residue recrystallized from isopropanol. Yield: 3 g., M.P. 224° (decomposition).

Anal.—Calcd. for $C_{12}H_{14}N_2O_4HCl$: C, 50.27; H, 5.27; N, 9.77; Cl, 12.37. Found: C, 50.22; H, 5.54; N, 9.91; Cl, 12.74.

EXAMPLE 7

(a) *5-Chloromethyl-2-Methoxy-3-Methylbenzoic Acid*

2-methoxy-3-methylbenzoic acid was chloromethylated using the procedure described in Example 1(a). After 4 hours at room temperature 4-chloromethyl-2-methoxy-3-methylbenzoic acid crystallised. It was separated by filtration and recrystallised from benzene. Yield: 17 g. from 29 g. of starting material. M.P. 186–187°.

*Anal.*—Calcd. for $C_{10}H_{11}ClO_3$: C, 55.76; H, 5.11. Found: C, 55.80; H. 4.70.

(b) Diethyl Acetamido-(3-Carboxy-4-Methoxy-5-Methylbenzyl)-Malonate

Alkylation of diethyl acetamidomalonate with 5-chloromethyl-2-methoxy-3-methylbenzoic acid was carried out in the same manner as described in Example 1(b). The title compound was obtained on work up as a viscous oil which, when cooled and rubbed under water, crystallised. After recrystallisation from ethanol, it melted at 225–226°.

*Anal.*—Calcd. for $C_{19}H_{26}NO_8$: C, 57.43; H, 6.53; N, 3.53. Found: C, 57.27; H, 6.01; N, 3.55.

(c) 3-Carboxy-5-Methyltyrosine 3 g. of diethyl acetamido-(3-carboxy-4-methoxy-5-methylbenzyl)-malonate were refluxed with 50 ml. of concentrated hydrochloric acid for 70 hours. The reaction mixture was cooled and the amino acid hydrochloride crystallised from the solution. It melted at 256–257° after recrystallisation from isopropyl alcohol. 3-carboxy-5-methyltyrosine precipitated from the solution when an aqueous solution of the hydrochloride was brought to pH 6.5 with base. Yield: 1.2 g. M.P. 271–272°.

*Anal.*—Calcd. for $C_{11}H_{13}NO_5$: C, 55.19; H, 5.47; N, 5.84. Found: C, 54.67; H, 6.38; N, 5.82.

EXAMPLE 8

(a) Diethyl Acetamido-(3-Carbomethoxy-4-Hydroxybenzyl)-Malonate

To a solution of 2.3 g. of sodium in 100 ml. of absolute alcohol were added 21.7 g. of diethylacetamidomalonate. The solution was stirred for 60° for 30 minutes, then concentrated to dryness in vacuo. Complete removal of alcohol was insured by two distillations with benzene. The residue was dissolved in 150 ml. of dimethylformamide. This solution was added dropwise at room temperature to a cooled solution of 20.1 g. of methyl 5-chloromethylsalicylate in 100 ml. of dimethylformamide. The mixture was stirred for 20 hours at room temperature. Poured onto 1 kg. ice and filtered after 6 hours of refrigeration, the crude product was dried and recrystallised first from 50% isopropanol, and then twice from 100% isopropanol. Yield: 11.5 g. M.P. 127–129°.

*Anal.*—Calcd. for $C_{18}H_{23}NO_8$: C, 56.69; H, 6.08; N, 3.67. Found: C, 56.81; H, 5.75; N, 3.47.

(b) 3-Carboxytyrosine Hydrochloride 1.5 g. of diethyl acetamido-(3-carbomethoxy-4-hydroxybenzyl)-malonate were refluxed with 25 ml. of concentrated hydrochloric acid for 14 hours. Concentration of the reaction mixture in vacuo and recrystallisation of the residue from a mixture of ethanol and methanol gave 1 g. of 3-carboxytyrosine hydrochloride. M.P. 260–261°.

This product is identical with the product described in Example 2.

EXAMPLE 9

(a) 5-Chloromethyl-2-Ethoxybenzoic Acid 33.2 g. of o-ethoxybenzoic acid was chloromethylated using the procedure described in Example 1(a). After 24 hours at room temperature, an oil separated. It was extracted with benzene. The benzene extract was washed twice with water and dried over calcium chloride. Evaporation of the benzene in vacuo left a crystalline residue of 5-chloromethyl-2-ethoxybenzoic acid which melted at 51–52° after recrystallization from a mixture of benzene and hexane. Yield, 24 g.

*Anal.*—Calcd. for $C_{10}H_{11}ClO_3$: C, 55.95; H, 5.17. Found: C, 55.90; H, 5.58.

(b) Diethyl Acetamido-(3-Carboxy-4-Ethoxybenzyl)-Malonate

Using the same reaction conditions described in Example 1(b), 5-chloromethyl-2-ethoxybenzoic acid was reacted with diethyl acetamidomalonate. The expected reaction product diethyl acetamido-(3-carboxy-4-ethoxybenzyl)-malonate was obtained as a crystalline solid which melted at 133–134° after recrystallisation from ethyl acetate.

*Anal.*—Calcd. for $C_{19}H_{25}NO_8$: C, 57.71; H, 6.37, N, 3.56. Found: C, 57.38; H, 6.69; N, 4.01.

(c) 3-Carboxy-4-Ethoxyphenylalanine Hydrochloride 4 g. of diethyl acetamido-(3-carboxy-4-ethoxybenzyl)-malonate was refluxed with a mixture of 2.5 ml. of concentrated hydrochloric acid and 22.5 ml. of water for 19 hours. The reaction mixture was concentrated and the crystalline residue recrystallised from isopropyl alcohol. Yield: 2.0 g. M.P. 206–207°.

*Anal.*—Calcd. for $C_{12}H_{16}NO_5HCl$: C, 49.65; H, 5.55; N, 4.79. Found: C, 49.36; H, 5.52; N, 4.85.

EXABPLE 10

(a) Acetamido-(3-Carboxy-4-Methoxybenzyl)-Malonic Acid 5 g. of diethyl acetamido-(3-carboxy-4-methoxybenzyl)-malonate prepared as described in Example 1(b), were refluxed for 4 hours with 10% sodium hydroxide. The reaction mixture was cooled and acidified to pH 3 with dilute hydrochloric acid. Acetamido-(3-carboxy-4-methoxybenzyl)-malonic acid precipitated. It was recrystallised from dilute acetic acid and melted at 182–183°.

*Anal.*—Calcd. for $C_{14}H_{15}NO_8$: C, 51.69; H, 4.61; N, 4.30. Found: C, 51.97; H, 4.82; N, 3.94.

(b) N-Acetyl-3-Carboxy-4-Methoxyphenylalanine 3 g. of the malonic acid obtained as described above were refluxed for 24 hours with 50% alcohol. The reaction mixture was concentrated to a syrupy residue, which crystallised upon the addition of ether. After recrystallisation from a mixture of ethanol and ether, it melted at 70–71°.

*Anal.*—Calcd. for $C_{13}H_{15}NO_6$: C, 55.51; H, 5.33. Found: C, 56.39; H, 5.61.

EXAMPLE 11

N-Acetyl-3-Cyano-2.4-Dimethoxyphenylalanine 10 g. of the malonate obtained as described in Example (6b) were refluxed first for half an hour with 60 ml. of 2.5 N sodium hydroxide. When the reaction mixture was acidified with dilute hydrochloric acid, none of the desired product precipitated. The solution was then made approximately 1 N with respect to hydrochloric acid and refluxed for 16 hours. It was evaporated to dryness, water added and the insoluble material filtered off. The filtrate was evaporated to dryness, leaving N-acetyl-3-cyano-2.4-dimethoxyphenylalanine, which melted at 202–203° after recrystallisation from water.

*Anal.*—Calcd. for $C_{14}H_{16}N_2O_5$: C, 57.53; H, 5.52, N, 9.59. Found: C, 57.20; H, 5.36; N, 9.71.

EXAMPLE 12

N-Acetyl-3-(4'-Acetyloxy-3'-Carboxyphenyl)-Alanine 1 g. of 3-carboxytyrosine hydrochloride, obtained as described in Example 2 or 8, was dissolved while refluxing in a mixture of 5 ml. of acetic acid and 5 ml. of acetic anhydride. It was then warmed at 50–60° for 3 hours. The syrupy residue which was obtained upon evaporation of the solvents in vacuo crystallised while rubbing under ether. It was washed several times with ether and recrystallised from a mixture of ethyl acetate and isopropyl alcohol. The product so obtained melted at 90° with decomposition.

*Anal.*—Calcd. for $C_{14}H_{15}NO_7$: C, 54.41; H, 4.85; N, 4.52. Found: C, 54.66; H, 5.26; N, 4.12.

EXAMPLE 13

(a) *Methyl 3-Bromomethyl-2-Methoxybenzoate*)

A mixture of 35.6 g. of N-bromosuccinimide, 36 g. of methyl 3-methyl-2-methoxybenzoate, 8 g. of benzoyl peroxide and 200 ml. of carbon tetrachloride was stirred and refluxed for 12 hours. Unreacted succinimide was filtered off and washed with carbon tetrachloride. The filtrate and washings were combined and concentrated in vacuo to an oily residue which was dissolved in benzene and chromatographed on a column of alumina. The percolate was concentrated in vacuo and the residual oil distilled. Yield: 21 g. of material which distilled at 125° (1.6 mm. Hg).

*Anal.*—Calcd. for $C_{10}H_{11}BrO_3$: C, 46.33; H, 4.26. Found: C, 49.35; H, 5.67.

(b) *Diethyl Acetamido-(3-Carbomethoxy-2-Methoxybenzyl)-Malonate*

Methyl 3-bromomethyl-2-methoxybenzoate was used to alkylate diethyl acetamidomalonate in the same way as described in Example (5b). The reaction mixture was refluxed for 24 hours and gave after work up a heavy syrup. It was purified by chromatography on alumina.

(c) *3-Carboxy-2-Methoxyphenylalanine Hydrochloride*

Diethyl acetamido-(3-carbomethoxy-2-methoxybenzyl)-malonate was hydrolysed with 1.2 N hydrochloric acid for 20 hours. Concentration of the reaction mixture in vacuo gave a crystalline residue with was recrystallised from a mixture of isopropyl alcohol and ethyl alcohol. The pure product melted at 192° after recrystallization.

*Anal.*—Calcd. for $C_{11}H_{13}NO_5 \cdot HCl$: C, 48.08; H, 5.09; N, 5.09. Found: C, 47.80; H, 5.19; N, 5.28.

What is claimed is:

1. A member selected from the group consisting of a compound of the general formula:

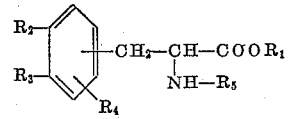

wherein $R_1$ represents a member selected from the group consisting of hydrogen, lower alkyl groups and the benzyl group, $R_2$ represents a member selected from the group consisting of hydroxy, lower alkoxy, lower alkanoyloxy, phenoxy and benzyloxy groups, $R_3$ represents a member selected from the group consisting of carboxy, lower carbalkoxy, cyano and carboxamido groups, $R_4$ represents a member selected from the group consisting of hydrogen, hydroxy, lower alkyl and lower alkoxy groups, and $R_5$ represents a member selected from the group consisting of hydrogen, lower alkanyol groups and the benzoyl group, and an addition salt thereof with a therapeutically acceptable non-toxic acid.

2. 3-Carboxy-4-methoxy-phenylalanine hydrochloride.
3. 3-Carboxy-tyrosine hydrochloride.
4. 3-Carboxy-4-methoxy-phenylalanine.
5. 3-Carboxy-tyrosine.
6. Carboxy-2-methoxyphenylalanine hydrochloride.

References Cited in the file of this patent
UNITED STATES PATENTS 2,833,810    Kissman et al. _____ May 6, 1958

UNITED STATES PATENT OFFICE
CERTIFICATE OF CORRECTION

Patent No. 3,023,235              February 27, 1962

Frederick Leonard

It is hereby certified that error appears in the above numbered patent requiring correction and that the said Letters Patent should read as corrected below.

Column 1, line 24, for "etyl" read -- ethyl --; line 32, for "benyloxy" read -- benzyloxy --; lines 60 to 65, the formula should appear as shown below instead of as in the patent:

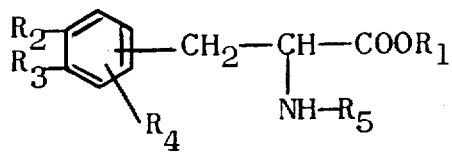

column 2, line 21, for "presented" read -- represented --; line 38, for "$R_1$" read -- $R_1'$ --; column 3, lines 3 to 7, the formula should appear as shown below instead of as in the patent:

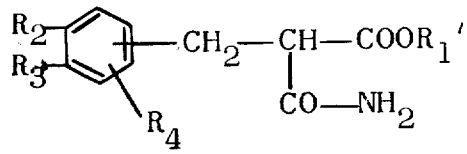

line 9, for "$R_1$" read -- $R_1'$ --; same column 3, line 40, for "direction" read -- direct --; column 4, line 1, for "3.6-" read -- 3.6-bis- --; column 5, line 68, for "benzyamine" read -- benzylamine --; line 75, for "Forumla" read -- Formula --; column 6, line 10, for "XVIII" read -- XV --; column 7, line 17, for "decompositiond" read -- decomposition --; column 8, line 42, for "N-hexane-" read -- n-hexane- --; column 10, line 25, for "EXABPLE" read -- EXAMPLE --; column 11, line 7, strike out the closing parenthesis, second occurrence; column 12, line 32, for "Carboxy-" read -- 3-Carboxy- --.

Signed and sealed this 4th day of September 1962.

(SEAL)
Attest:
ERNEST W. SWIDER
Attesting Officer

DAVID L. LADD
Commissioner of Patents